United States Patent
Barbastathis et al.

(10) Patent No.: US 6,975,459 B2
(45) Date of Patent: Dec. 13, 2005

(54) MICRO-ACTUATED ADAPTIVE DIFFRACTIVE COMPOSITES

(75) Inventors: George Barbastathis, Boston, MA (US); Sang-Gook Kim, Wayland, MA (US); Wei-Chuan Shih, Cambridge, MA (US); Chee Wei Wong, Cambridge, MA (US); Yong-Bae Jeon, Lexington, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 10/387,026

(22) Filed: Mar. 12, 2003

(65) Prior Publication Data
US 2004/0179268 A1 Sep. 16, 2004

(51) Int. Cl.[7] ................................................. G02B 5/18
(52) U.S. Cl. ........................ 359/573; 359/569; 359/566
(58) Field of Search ................................. 359/575, 566, 359/569, 565, 573, 571, 572

(56) References Cited

U.S. PATENT DOCUMENTS

| 6,480,334 B1 | * | 11/2002 | Farn | 359/575 |
| 6,643,065 B1 | * | 11/2003 | Silberman | 359/573 |
| 2002/0003925 A1 | | 1/2002 | Little et al. | |

FOREIGN PATENT DOCUMENTS

| EP | 0 486 356 | 11/1991 |
| GB | 1012283 | 12/1965 |

* cited by examiner

Primary Examiner—Fayez G. Assaf

(57) ABSTRACT

A volume diffractive composite is disclosed for providing illumination at a first output angle. The volume diffractive composite comprises a first plurality of grating elements that are mutually spaced from another in a first position with a first spacing period along a first plane, and an actuation unit for changing at least one of the position or the spacing period of the first plurality of grating elements to a second position or spacing period to provide illumination at a second output angle.

33 Claims, 8 Drawing Sheets

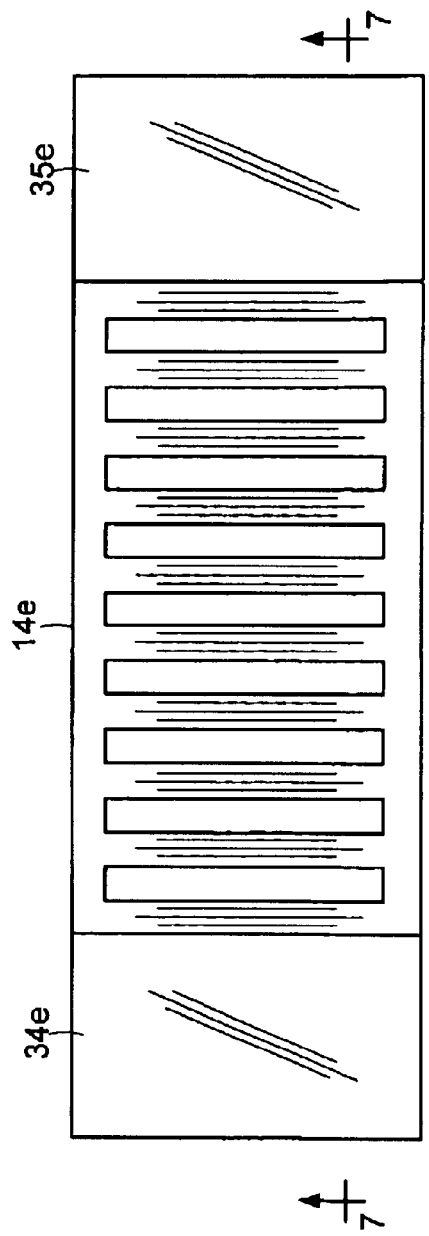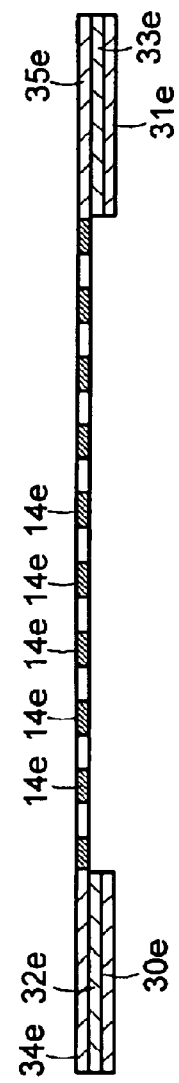
FIG. 6
FIG. 7

180
MICRO-ACTUATED ADAPTIVE DIFFRACTIVE COMPOSITES

BACKGROUND OF THE INVENTION

The invention relates to diffractive elements, and relates in particular to volume holograms. Volume holograms may be used for a variety of uses, including data storage, imaging, inter-connections for optical circuits, neural networks and communication systems etc. A variety of materials have been used for forming conventional volume holograms, including photorefractives and photopolymers. For example, U.S. Pat. No. 5,858,614 discloses the use of a polymerizable compound that is liquid at ambient temperature. Conventional recording materials however, may not be readily changed once a diffractive pattern or hologram has been recorded on them. In some cases, the original recording is permanent, while in other cases the diffractive pattern may be changed by erasing the old pattern and recording a new one. This is a time-consuming process and difficult to update the information content stored in the hologram.

Tunable diffraction gratings may be potential candidates for video-rate applications. The grating light valve (GLV by Silicon Light Machines of Sunnyvale, Calif.) is an example of a tunable grating. Such a device typically includes adjacent ribbons that may be actuated between two positions to provide either a reflective surface (in which the ribbons are aligned with one another) or a diffractive surface (in which alternate ribbons are displaced by $\frac{1}{4}\lambda$). While such grating light valves provide directional (e.g., zero and first order etc.) switching, they are not suitable for use in volume holograms because of resolution limit.

There is a need therefore, for a volume diffractive material that may be changed from a first volume diffractive pattern to a second volume diffractive pattern without requiring the erasure and the re-recording of a new diffractive pattern.

SUMMARY OF THE INVENTION

The invention provides a volume diffractive composite for providing illumination at a first output angle in accordance with an embodiment, wherein the volume diffractive composite comprises a first plurality of grating elements that are mutually spaced from another in a first position with a first spacing period along a first plane, and an actuation unit for changing at least one of the position or the spacing period of the first plurality of grating elements to a second position or spacing period to provide illumination at a second output angle. In accordance with further embodiments, the volume diffractive composite includes a second plurality of grating elements and a second actuation unit.

In accordance with further embodiments, the invention provides a method of forming a volume diffractive composite, wherein the method includes the steps of depositing a first material onto a substrate in a first diffractive pattern, depositing a sacrificial material on the first material, depositing a second material onto the sacrificial material in a second diffractive pattern, and removing the sacrificial material.

In accordance with a further embodiment, the invention provides a diffractive composite including a first plurality of grating elements formed by patterned deposition through a mask, the first plurality of grating elements being mutually spaced from another in a first position, and an actuation unit for changing at least one of the position or a spacing period of the first plurality of grating elements.

BRIEF DESCRIPTION OF THE DRAWING

The following description may be further understood with reference to the accompanying drawings in which:

FIG. 6 shows an illustrative top diagrammatic view of a layer of a volume diffractive composite in accordance with an embodiment of the invention;

FIG. 7 shows an illustrative side diagrammatic view of the single layer the volume diffractive element shown in FIG. 6 taken along line 7—7 thereof;

The drawings are shown for illustrative purposes and are not to scale.

DETAILED DESCRIPTION OF THE INVENTION

In accordance with an embodiment, the invention provides for volume diffractive elements that may be changed, for example, by tuning the Bragg angle, wavelength etc. Volume diffractive elements differ from thin diffractive elements in at least two fundamental ways. First, volumetric diffractive elements diffract a single diffraction only, whereas thin elements diffract multiple orders. Second, volume diffractive elements exhibit Bragg selectivity in terms of angle, wavelength, location of illumination etc.

Figure 1:
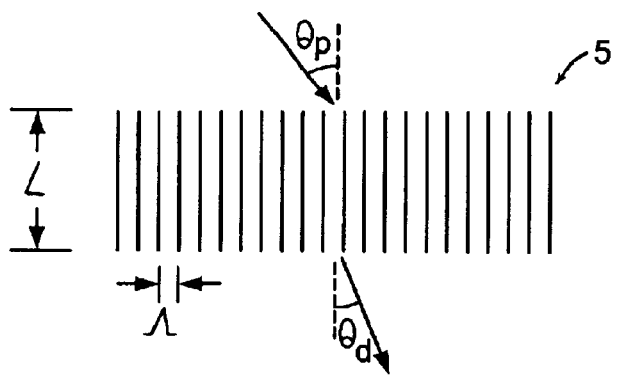
FIG. 1 shows an illustrative diagrammatic view of a conventional volume diffractive element.
Figure 2:
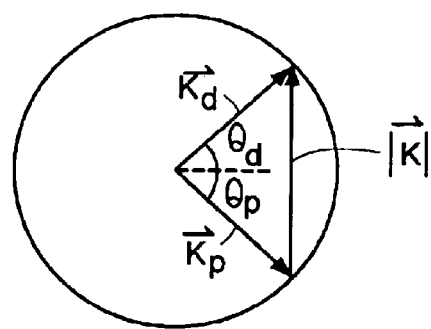
FIG. 2 shows an illustrative diagrammatic vector diagram illustrating the requirements for Bragg angle diffraction.

With reference to FIG. 1, a volume diffractive grating 5 may have a length L, and a grating period of $\Lambda$. Illumination having a wavelength $\lambda$ is received by the volume diffractive grating 5 at an angle $\theta_p$ as shown. The calculation of the angle of the diffracted field may be facilitated by using the K-sphere construction shown in FIG. 2. The illumination is represented by an illumination wavevector $\vec{k}_p$ that is oriented in the same direction as the illumination plane wave and has a length of $$|\vec{k}_p| = \frac{2\pi}{\lambda}.$$

The grating itself is represented in the K-sphere as a grating vector $\vec{K}$, which is oriented perpendicular to the grooves of the grating and has a length $$|\vec{K}| = \frac{2\pi}{\Lambda}.$$

The K-sphere is constructed with a radius equal to $$k = \frac{2\pi}{\lambda},$$

and the illumination wavevector is positioned so that the origin of the illumination wavevector coincides with the center of the K-sphere. The illumination wavevector must be oriented such that the tip of the sum-vector $$\vec{k}_d = \vec{k}_p + \vec{K} \qquad (1)$$

lies on the K-sphere. Therefore, the following relationship must hold:

$$\sin\theta_P = \frac{\lambda}{2\Lambda} \qquad (2)$$

If this condition is satisfied, then a diffractive plane wave emerges from the volume grating with a wavevector $\vec{k}_d$ given by equation (1) above. It follows, therefore, that the propagation angle $\theta_d$ of the diffracted wave is given by:

$$\sin\theta_d = \frac{\lambda}{2\Lambda} = \sin\theta_P \qquad (3)$$

If the angle of illumination is detuned by $\Delta\theta$ with respect to the angle specified in equation (2) above, then the diffraction efficiency $\eta$ of the grating drops by a factor:

$$\eta(\Delta\theta) = \eta_0 \text{sinc}^2\left(\frac{L(\Delta\theta)\sin\theta_S}{\lambda}\right) \qquad (4)$$

The single diffracted order of the grating therefore disappears when the angular detuning reaches the value:

$$\Delta\theta_{Bragg} = \frac{\lambda}{sL\sin\theta_S} \qquad (5)$$

Figure 3:
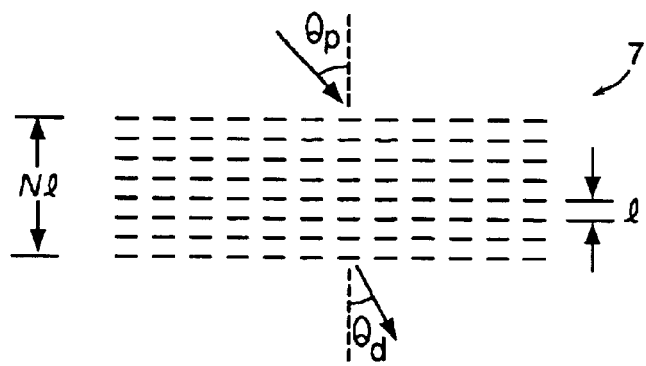
FIG. 3 shows illustrative diagrammatic view of a volume diffractive element in accordance with an embodiment of the invention.

This equation defines the Bragg angle selectivity of the volumetric grating. In accordance with an embodiment, an implementation of a structure 7 of the invention may be sampled in the volume depth direction due to the layered method of fabrication to provide N layers as shown in FIG. 3 such that the length L=Nl where l is the spacing between layers. The grating vector may be formed by the re-configurable layered structure. The quasi-Bragg condition is given by:

$$\theta_P = \cos^{-1}\frac{g}{m\lambda\cos\theta_d} \qquad (6)$$

where g is the spacing between discrete thin gratings, $\theta_d$ is the first order diffractive angle of the thin grating, and m is an integer. The diffraction efficiency is calculated with Born approximation and is given by:

$$\eta(\theta_P) = \eta_1 N^2 \frac{\text{sinc}^2\left(\frac{N\phi}{2\pi}\right)}{\text{sinc}^2\left(\frac{\phi}{2\pi}\right)} \qquad (7)$$

where:

$$\phi = \frac{2\pi g}{\lambda\cos\theta_d\cos\theta_P} \qquad (8)$$

Figure 4B:
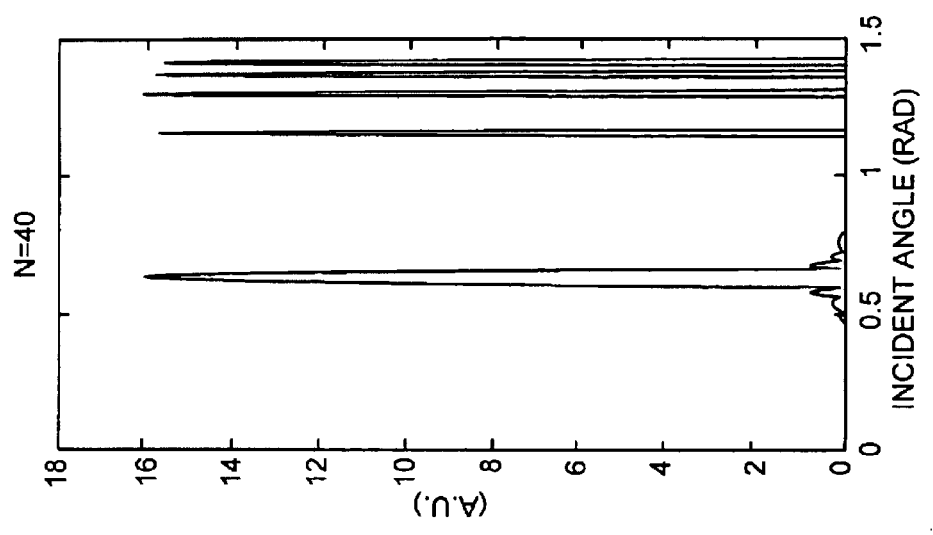
FIGS. 4A and 4B show illustrative graphical representations of Bragg matching angles for different values for the number of layers N in the volume diffractive element of FIG. 3.
Figure 4A:
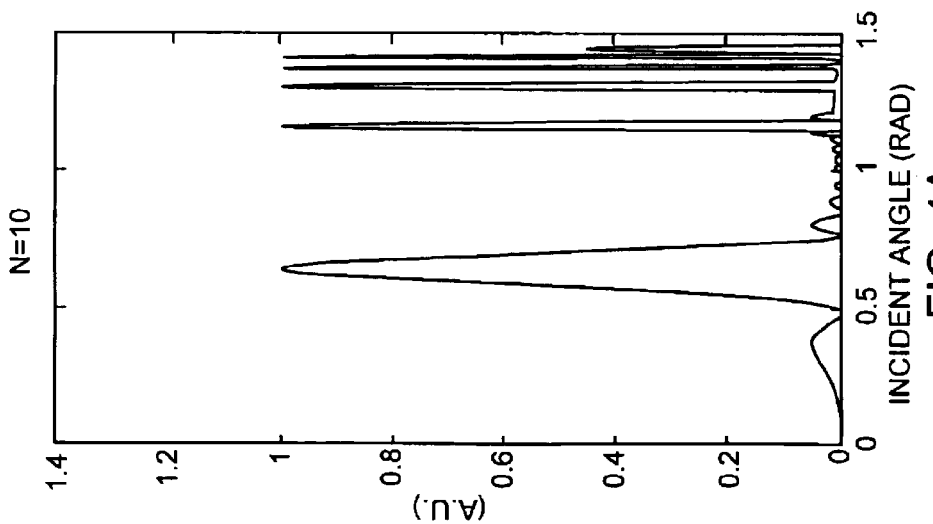

Illustrative calculated values for Bragg matching angles for N=10 and for N=40 are shown in FIGS. 4A and 4B versus amplitude in arbitrary units.

In accordance with various embodiments of the invention, tunable grating devices for use in volume diffractive composites are disclosed that permit analog control over the diffraction angle of discrete layers of volume diffractive composites. Actuation of discrete layers may be achieved by electrostatic or piezoelectric actuation of grating spacing modifiers. Devices of the invention may be used, for example, in micro-spectrometers, external cavity tunable lasers, thermal compensators for wavelength multiplexers and demultiplexers, etc.

A diffractive element of the invention may include at least one drive unit, such as a comb-drive or an electrostatic actuator that may pull on one or each side of a periodic structure. The periodic structure is composed of grating elements and in certain electrostatic embodiments, the structure may include flexure springs that connect each grating element to its adjacent grating elements. If used, the flexure springs may determine the stiffness of the structure, and the structure may be attached to a silicon substrate through anchors.

A structure of the invention may be formed by depositing a grating material in a pattern on a sacrificial substrate. A further sacrificial layer is then deposited onto the pattern, and multiple layers of grating material and sacrificial layers are then deposited onto one another such that the patterned portions are spaced from one another in the horizontal direction as well as the vertical direction. The sacrificial layers are then removed leaving a grid of grating portions.

Figure 5A:
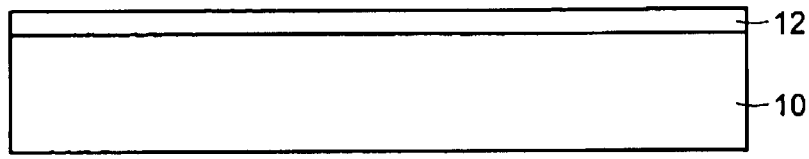
FIGS. 5A–5D show illustrative diagrammatic views of a portion of a volume diffractive composite of the invention during formation.
Figure 5B:
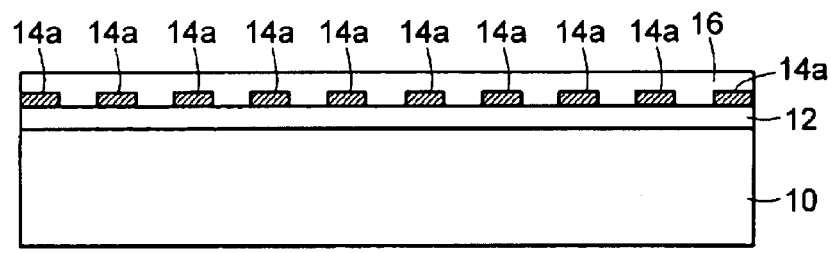
Figure 5C:
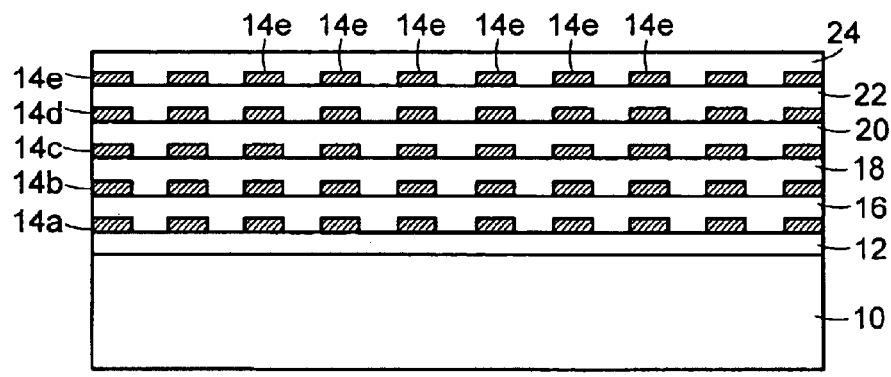

In particular, as shown in FIG. 5A a sacrificial layer 12, comprising for example a 0.2 micron silicon dioxide ($SiO_2$) layer, is deposited or grown onto a base structure 10, which may be a diffusion barrier for a piezoelectric material, Pb(Zr, Ti)$O_3$. A grating material 14a, such as a platinum bottom electrode, is then formed on the layer 12, for example by patterned evaporation through a mask using an HF/HCL reagent, and a second sacrificial layer 16 is then deposited on the grating material 14a, filling the cavities between the grating elements 14a as shown in FIG. 5B. A second layer of grating material 14b is then formed on the layers 16, followed by a third layer of sacrificial material 18 as shown in FIG. 5C. Many further layers of grating material (e.g., 14c, 14d, 14e) and sacrificial layers (e.g., 20, 22, 24) may then be deposited onto one another as shown in FIG. 5C.

Figure 5D:
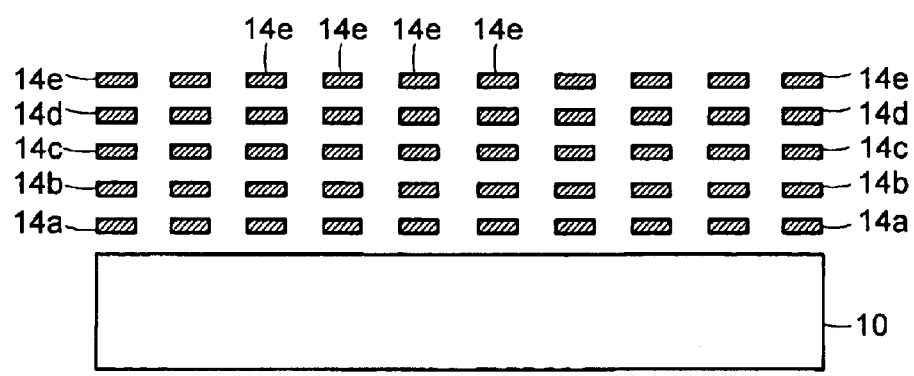

The structure may then be exposed to a chemical wash, using for example potassium hydroxide, that dissolves and removes the sacrificial layers 12, 16, 18, 20, 22, 24 leaving a grid formed of a plurality of layers of grating material 14*a*, 14*b*, 14*c*, 14*d*, 14*e* as shown in FIG. 5D. The ends of each of the grating elements are joined to one another in various ways in different embodiments as discussed below.

With reference to FIGS. 6 and 7, in the piezoelectric version, each layer (e.g., 14*e*) of grating material is unitary, providing rectangular opening between which are defined diffractive elements. During fabrication, a 0.2 micron oxide is first grown as a diffusion barrier for the piezoelectric material. The platinum bottom electrodes 30*e* and 31*e* are then deposited via evaporation and patterned. Piezoelectric material 32*e*, 33*e* Pb(Zr, Ti)O$_3$, is then deposited and patterned with a HF/HCL reagent. The top electrodes 34*e*, 35*e* and the gratings are then deposited and patterned similarly like the bottom electrode. The final step involves of a potassium hydroxide etch from the backside of the wafer to release the membrane structure.

Figure 8:
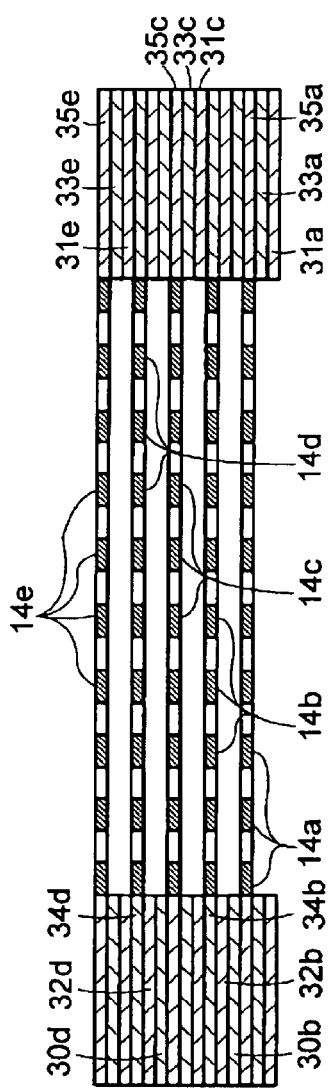
FIG. 8 shows an illustrative side diagrammatic view of the volume diffractive composite of the invention shown in FIG. 6 taken along line 8—8 thereof.
Figure 9:
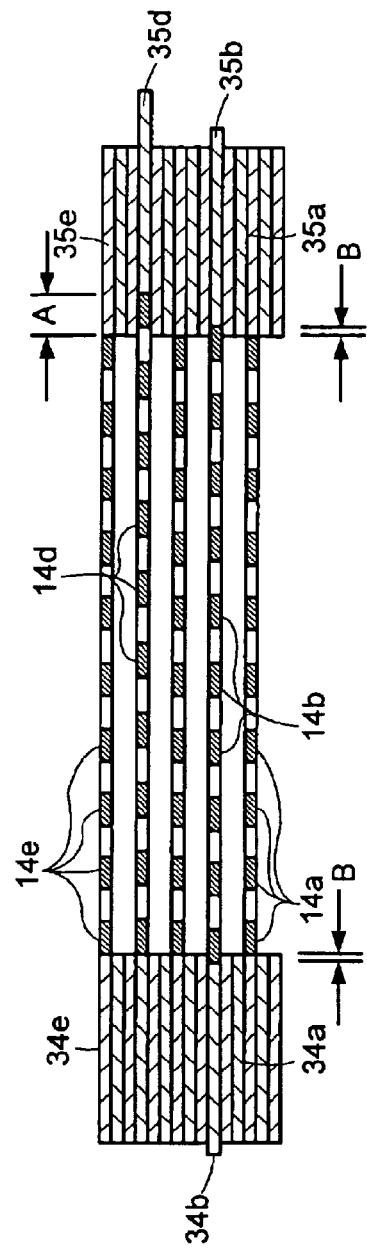
FIG. 9 shows an illustrative side diagrammatic view of the volume diffractive composite of FIG. 6 during active modification of various diffractive elements thereof.

During use, the electrodes 30*e*, 31*e* are anchored. When a voltage is applied across the electrodes 30*e* and 34*e*, the electrode 34*e* is caused to move relative to the electrode 30*e* due to the presence of the piezoelectric material 32*e*. Similarly, when a voltage is applied across the electrodes 31*e* and 35*e*, the electrode 35*e* is caused to move relative to the electrode 31*e* due to the presence of the piezoelectric material 33*e*. In this way, the position of each end of each layer may be adjusted independent of the other end and independent of other layers. For example, as shown in FIGS. 8 and 9, each of the layers (e.g., 14*a*–14*e*), includes a plurality of grating elements 14 that are mutually coupled to each other at either end thereof. The endmost elements are coupled to respective piezoelectric actuators (30, 32, 34) and (31, 33, 35). Either or both ends of each grating element 14 of a single layer may be moved relative the other layers through selective actuation of the piezoelectric actuators. For example, as shown in FIG. 9, one end of layer d is stretched by actuating a piezoelectric actuator to stretch the layer of grating elements 14*d*. The spacing between the grating elements as well as the relative positioning of the grating elements is thereby changed. An end-most grating element, therefore, may be moved a distance as indicated at A in FIG. 9. The stretching is achieved through flexure of the sides of the layer 14. The other end of each layer may similarly be moved as well. For example, layer b shows both ends being stretched to change the spacing between the grating elements as well as their relative positioning with respect to the other layers. Each of the end-most grating elements, therefore, may be moved a distance as shown at B in FIG. 9.

The relative spacing between grating elements in a layer may, therefore, be changed, as well as the relative positioning between layers of grating elements. In fact, the relative positioning of a layer may be changed without changing the spacing by actuating each piezoelectric actuator the same amount in opposite directions. By adjusting the position and/or spacing of each layer independently, the diffractive properties of the volume diffractive grating may be easily and readily changed. The grating elements may be reflective or opaque to provide amplitude modulation of the received illumination. In other embodiments, the grating elements may be clear to provide phase modulation of the received illumination. In various embodiments, the composite itself may be transmissive or reflective.

Figure 10:
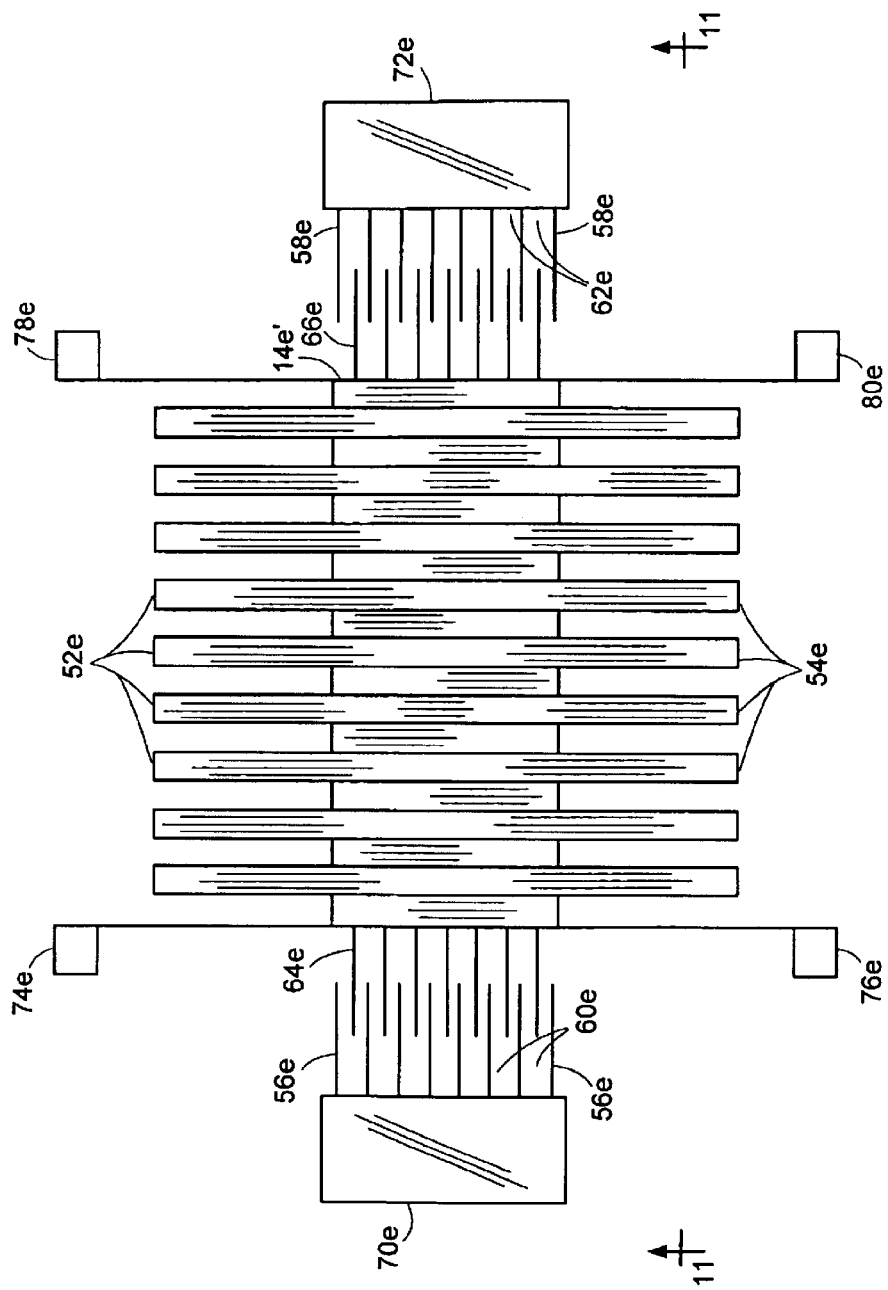
FIG. 10 shows an illustrative top diagrammatic view of a volume diffractive composite in accordance with a further embodiment of the invention.

In the electrostatic version, the ends of the grating elements in each layer of grating material (e.g., 14*e'*) are coupled to one another via flexure springs 52*e* and 54*e* as shown in FIG. 7. The flexure springs are also formed during the deposition processes discussed above with reference to FIGS. 5—5. The grating elements at either end of the structure are each further coupled to a comb drive mechanism that includes, for example, drive extensions 56*e* and 58*e* that form cavities 60*e* and 62*e*, and conductive fingers 64*e* and 66*e* that are received within the cavities 60*e* and 62*e* as shown in FIG. 10. The drive extensions are coupled to drive units 70*e* and 72*e* respectively, and the conductive fingers 64*e* and 66*e* are coupled to the outside edge of the grating elements at the edge of each layer as shown in FIG. 10. The element may further include one or more anchors 74*e*, 76*e*, 78*e*, 80*e*. The drive mechanism and optional anchors are also formed by the above discussed deposition processes.

In further embodiments, a structure of the invention may be formed using a silicon-on-insulator wafer that has a 10 micron thick device layer and a 0.5 micro thick buried oxide.

The device layer may be first etched using deep reactive ion etching technology, which allows the development of grating elements and flexure springs that are 10 microns thick. This increases the vertical stiffness of the structure and inhibits potential stiction problems during the release step. In further embodiments, lateral bumps may be employed to further reduce lateral stiction. The resulting structure is essentially residual-stress free because there is no film deposition. Moreover, because the buried oxide behaves essentially like a good etch stop, the design further avoids etching non-uniformities due to different exposure areas. The deep reactive etching technology process is followed by a hydrofluoric acid etching step to release the moving parts. Since the lateral dimension of the movable parts is much smaller than that of the fixed parts, large process latitude exists during the time-controlled release process. After releasing, an aluminum film is deposited to form electrodes and may also be used to form the surface on the gratings in certain embodiments.

The flexure stiffness of the flexure springs, the comb-drive pairs, and the grating period are each important design parameters. The stiffness of the flexure may be estimated by $k=Ew^3t/L^3$, where the effective spring constant for one period is on the left side, E is the Young's modulus of the material, t is the thickness of the structure, w is the width of the flexure beam, and L is the length of the folded beam. The flexure stiffness is selected based on a trade-off: low tuning voltage (<100 V) requires the device to be compliant. Additionally, the device should be stiff enough that the resonant frequency remains high (10 kHz or higher).

The driving force is rendered by the two comb-drives on the sides. Comb-drives draw very little current and therefore minimize power consumption, though the force delivered is relatively small (micro-Newtons or less). The force may be estimated as $F=N\epsilon tV^2/2g$, where N is the number of fingers, and V is the applied voltage. The minimum grating period is set by the resolution of the available lithography tool. Since the flexures on the sides of the grating must be defined, the minimum grating pitch is, at best, 4 times the design rule for 75% duty cycle or 6 times for the design rule for 50% duty cycle. In the piezoelectric version, the driving force is via the deposited thin-film piezoelectric actuators. The diffractive grating was etched above the membrane such that its period could be tuned progressively to a desired value in response to stretching of the membrane. Such devices may be designed such that the deformation may be on the order of 1–2 nm per period at an applied voltage of 0.05 volts. Further designs of the device may include free cantilever devices or perforated membrane devices.

Figure 11:
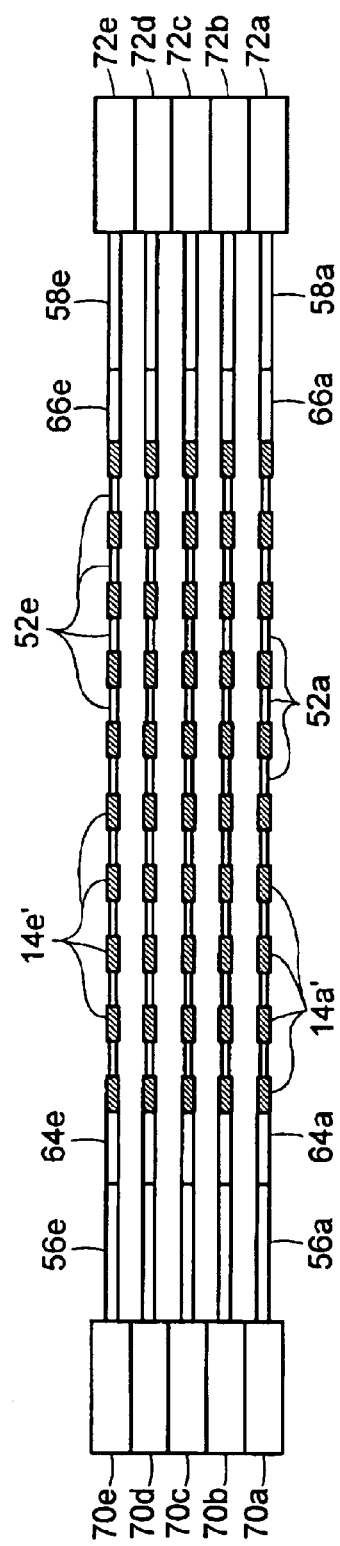
FIG. 11 shows an illustrative side diagrammatic view of the volume diffractive composite of the invention shown in FIG. 10 taken along line 11—11 thereof.
Figure 12:
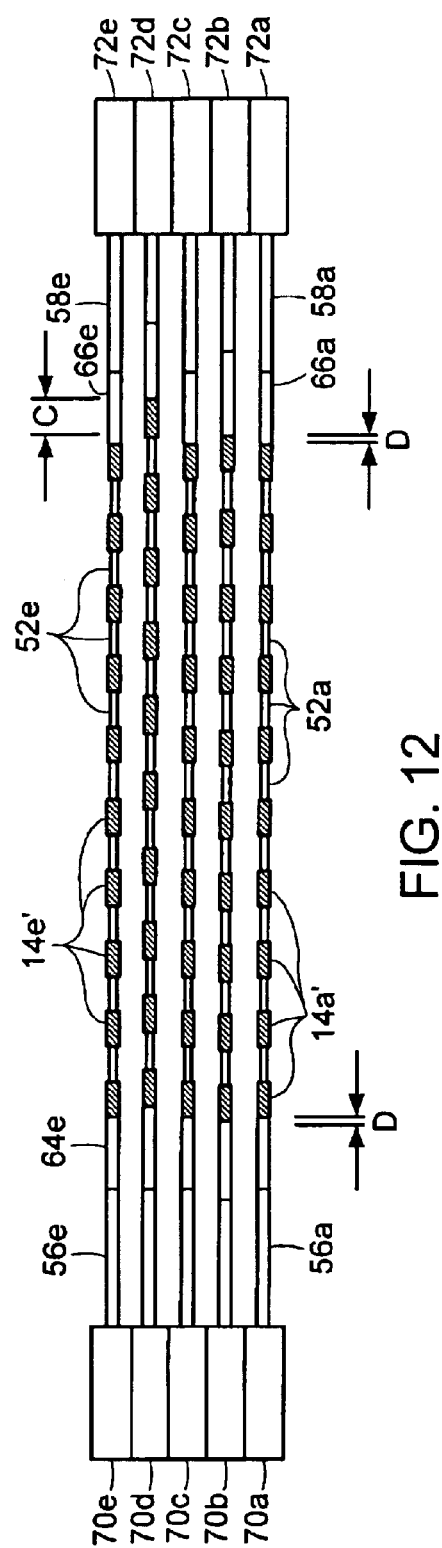
FIG. 12 shows an illustrative side diagrammatic view of the volume diffractive composite of FIG. 10 during active modification of various diffractive elements thereof.

As shown in FIG. 11, each of the layers (e.g., 14*a'*–14*e'*), includes a plurality of grating elements as well as fingers 64, 66, and drive extensions 56, 58 that are coupled to drive units 70, 72. Either or both ends of the grating elements of a single layer may be moved relative the other layers through selective actuation of the drive units 70, 72. For example, as shown in FIG. 12, one end of layer d is stretched by actuating drive unit 72d to stretch the layer of grating elements 14d'. The spacing between the grating elements as well as the relative positioning of the grating elements is thereby changed. An end-most grating element, therefore, may be moved a distance as indicated at C in FIG. 12. The stretching is achieved through flexure of the resilient springs 52, 54 shown in FIG. 10. The other end of each layer may similarly be moved as well. For example, layer b shows both ends being stretched to change the spacing between the grating elements as well as their relative positioning with respect to the other layers. Each of the end-most grating elements, therefore, may be moved a distance as shown at D in FIG. 12.

The relative spacing between grating elements in a layer may, therefore, be changed, as well as the relative positioning between layers of grating elements. In fact, the relative positioning of a layer may be changed without changing the spacing by moving each drive unit the same amount in opposite directions.

The diffraction angle of a grating is given by $\sin\theta = m\lambda/p$ where m is the diffractive order, $\lambda$ is the wavelength of the incident light, and p is the pitch of the grating. Expanding the previous equation for a smaller period change $\Delta p$, the response angle $\Delta\theta$ is given by $$\Delta\theta \approx -m\lambda\Delta p/p^2 \cos\theta \quad (9)$$

which reduces to $$\Delta\theta \approx -\lambda\Delta p/p^2 \quad (10)$$

for m=1 and $\theta \ll 1$ rad. For example, if $\Delta p$=10 nm, then $\Delta\theta = 10^{-3}$ degrees at $\lambda$=532 nm.

Figure 13:
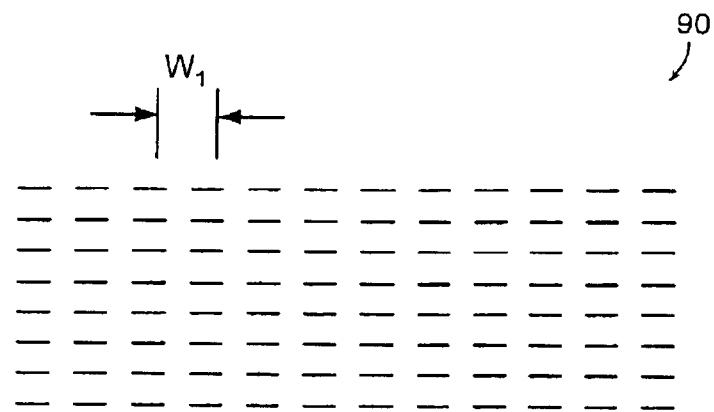
FIGS. 13, 14 and 15 show illustrative diagrammatic views of volume diffractive elements of various embodiments of the invention during use.
Figure 14:
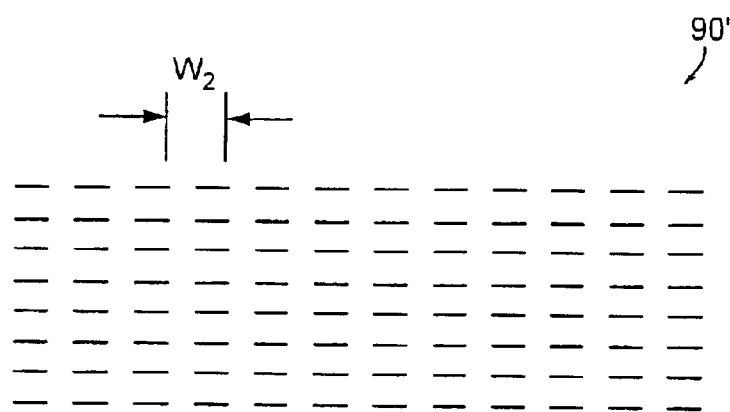
Figure 15:
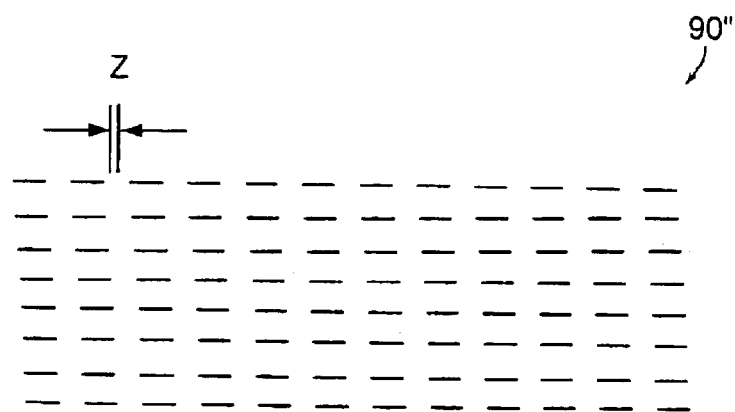

As shown in FIGS. 13 and 14, the period of each layer of grating elements may be uniformly changed throughout the composite from $\omega_1$ as shown at 90 in FIG. 13 to $\omega_2$ as shown at 90' in FIG. 14. In other uses, the position of each successive layer of the composite may be uniformly shifted with respect to the previous layer by a distance z as shown at 90" in FIG. 15. Again, the grating elements may be opaque or reflective (providing amplitude modulation) or may be clear (providing phase modulation) in certain embodiments. In various embodiments, the composite itself may be transmissive or reflective.

Those skilled in the art will appreciate that numerous modifications and variations may be made to the above disclosed embodiments without departing from the spirit and scope of the invention.

What is claimed is:

1. A volume diffractive composite for providing illumination at a first output angle, said volume diffractive composite comprising:
   a first plurality of grating elements that are mutually spaced from another in a first position with a first spacing period along a first plane;
   a second plurality of grating elements that are mutually spaced from another in a second position with a second spacing period that is different than the first spacing period along a second plane;
   first actuation means for changing at least one of the position or the spacing period of said first plurality of grating elements to a third position or spacing period; and
   second actuation means for changing at least one of the position or spacing period of said second plurality of grating elements to a fourth position or spacing period independent of said first position and spacing period and said third position and spacing period.

2. The volume diffractive composite as claimed in claim 1, wherein said first plurality of grating elements is formed by patterned deposition through a mask.

3. The volume diffractive composite as claimed in claim 1, wherein said actuation means includes a piezoelectric actuator.

4. The volume diffractive composite as claimed in claim 1, wherein said actuation means includes a comb-drive mechanism.

5. The volume diffractive composite as claimed in claim 1, wherein said grating elements of said first plurality of grating elements are coupled to one another by flexure springs.

6. The volume diffractive composite as claimed in claim 1, wherein each of said plurality of grating elements is transparent.

7. The volume diffractive composite as claimed in claim 1, wherein each of said plurality of grating elements is reflective.

8. The volume diffractive composite as claimed in claim 1, wherein each of said plurality of grating elements is opaque.

9. A volume diffractive composite comprising:
   a first plurality of grating elements that are mutually spaced from another in a first position;
   a second plurality of grating elements that are mutually spaced from another in a second position;
   first actuation means for changing at least one of the position or a spacing period of said first plurality of grating elements independent of said second position or a spacing period of said second plurality of said grating elements; and
   second actuation means for changing the spacing period of said second plurality of grating elements to a fourth spacing period independent of said first spacing period of said first plurality of said grating elements.

10. The volume diffractive composite as claimed in claim 9, wherein said first plurality of grating elements is formed by patterned deposition through a mask.

11. The volume diffractive composite as claimed in claim 9, wherein said first actuation means includes a piezoelectric actuator.

12. The volume diffractive composite as claimed in claim 9, wherein said first actuation means includes a comb-drive mechanism.

13. The volume diffractive composite as claimed in claim 9, wherein each of said plurality of grating elements is transparent.

14. The volume diffractive composite as claimed in claim 9, wherein each of said plurality of grating elements is reflective.

15. The volume diffractive composite as claimed in claim 9, wherein each of said plurality of grating elements is opaque.

16. A diffractive composite comprising:
   a first plurality of grating elements formed by patterned deposition through a mask, said first plurality of grating elements being mutually spaced from another in a first position;
   a second plurality of grating elements formed by pattern deposition through a mask, said second plurality of grating elements being mutually spaced from another in a second position;

first actuation means for changing at least one of the position or a spacing period of said first plurality of grating elements; and second actuation means for changing at least one of the position or a spacing period of said second plurality of grating elements independent of said first plurality of grating elements.

17. The diffractive composite as claimed in claim 16 wherein said first plurality of grating elements is formed using patterned evaporation.

18. The diffractive composite as claimed in claim 16 wherein said actuation means includes a piezoelectric actuator.

19. The diffractive composite as claimed in claim 16 wherein said actuation means includes a comb-drive mechanism.

20. The diffractive composite as claimed in claim 16 wherein said grating elements of said first plurality of grating elements are coupled to one another by flexure springs.

21. The diffractive composite as claimed in claim 16, wherein said actuation means changes the position of said first plurality of grating elements relative to a base substrate.

22. The diffractive composite as claimed in claim 16, wherein said actuation means changes the spacing period of said first plurality of grating elements.

23. The diffractive composite as claimed in claim 16, wherein each of said plurality of grating elements is transparent.

24. The diffractive composite as claimed in claim 16, wherein each of said plurality of grating elements is reflective.

25. The diffractive composite as claimed in claim 16, wherein each of said plurality of grating elements is opaque.

26. A volume diffractive composite for providing illumination at first output angle, said volume diffractive composite comprising:

a first plurality of grating elements that are mutually spaced from another in a first position with a first spacing period along a first plane;

a second plurality of grating elements that are mutually spaced from another in a second position with a second spacing period along a second plane;

first actuation means for changing the spacing period of said first plurality of grating elements to a spacing period; and second actuation means for changing the spacing period of said second plurality of grating elements to a fourth spacing period independent of said first spacing period and said third spacing period.

27. The volume diffractive composite as claimed in claim 26, wherein said first plurality of grating elements is formed by patterned deposition through a mask.

28. The volume diffractive composite as claimed in claim 26, wherein said actuation means includes a piezoelectric actuator.

29. The volume diffractive composite as claimed in claim 26, wherein said actuation means includes a comb-drive mechanism.

30. The volume diffractive composite as claimed in claim 26, wherein said grating elements of said first plurality of grating elements are coupled to one another by flexure springs.

31. The volume diffractive composite as claimed in claim 26, wherein each of said plurality of grating elements is transparent.

32. The volume diffractive composite as claimed in claim 26, wherein each of said plurality of grating elements is reflective.

33. The volume diffractive composite as claimed in claim 26, wherein each of said plurality of grating elements is opaque.

* * * * *